United States Patent [19]

Yoshino et al.

[11] Patent Number: 5,021,957
[45] Date of Patent: Jun. 4, 1991

[54] BRAKE CONTROL APPARATUS IN DIAGONAL BRAKING PRESSURE SUPPLY SYSTEM FOR USE IN MOTOR VEHICLES

[75] Inventors: Yasuhisa Yoshino, Okazaki; Yoshifumi Kato, Nishikamo; Yukimasa Tamatsu, Nagoya; Kenji Takeda, Okazaki, all of Japan

[73] Assignees: Nippon Soken, Inc., Nishio; Nippondenso Co., Ltd., Kariya, both of Japan

[21] Appl. No.: 433,613

[22] Filed: Nov. 9, 1989

[30] Foreign Application Priority Data

Nov. 10, 1988 [JP] Japan .................. 63-284391

[51] Int. Cl.$^5$ .............................................. B60T 8/32
[52] U.S. Cl. ..................... 364/426.01; 364/426.02; 303/95; 303/97; 303/106
[58] Field of Search ............... 364/426.01, 426.02; 303/95, 97, 98, 99, 106, 108

[56] References Cited

U.S. PATENT DOCUMENTS

| | | | |
|---|---|---|---|
| 4,566,737 | 1/1986 | Masaki et al. | 364/426.02 |
| 4,671,579 | 6/1987 | Sawano et al. | 364/426.02 |
| 4,793,662 | 12/1988 | Arikawa | 364/426.02 |
| 4,828,334 | 5/1989 | Salman | 364/426.02 |
| 4,855,917 | 8/1989 | Sawano et al. | 364/426.02 |

FOREIGN PATENT DOCUMENTS

| | | |
|---|---|---|
| 0209278 | 1/1987 | European Pat. Off. . |
| 3707536 | 9/1988 | Fed. Rep. of Germany . |
| 3728480 | 1/1989 | Fed. Rep. of Germany . |
| 58-199259 | 11/1983 | Japan . |
| 63-1382 | 1/1988 | Japan . |
| 63-240455 | 10/1988 | Japan . |
| 2191554 | 12/1987 | United Kingdom . |

Primary Examiner—Parshotam S. Lall
Assistant Examiner—Tyrone Queen
Attorney, Agent, or Firm—Cushman, Darby & Cushman

[57] ABSTRACT

A brake apparatus for use in a motor vehicle having at least one front wheel and at least one rear wheel. The brake apparatus includes a diagonal braking pressure supply system provided between a master cylinder and wheel braking cylinders for applying braking forces to the front and rear wheels. A proportioning valve is provided in the braking pressure supply system for controlling the braking pressure to be applied to the rear-wheel braking cylinder in accordance with a control signal so as to vary the ratio of the braking pressure to the rear-wheel braking cylinder with respect to the braking pressure to be applied to the front-wheel braking cylinder. Also included is an electronic control unit which produces the control signal to the proportioning valve. The electronic control unit obtains a command value on the basis of a parameter corresponding to the difference between the lock states of the front and rear wheels which are in turn obtained on the basis of signals indicative of speeds of the front and rear wheels. The control signal is determined in accordance with the command value and supplied to the proportioning valve.

8 Claims, 10 Drawing Sheets

BRAKE CONTROL APPARATUS IN DIAGONAL BRAKING PRESSURE SUPPLY SYSTEM FOR USE IN MOTOR VEHICLES

BACKGROUND OF THE INVENTION

The present invention relates generally to brake control apparatus, and more particularly to such a brake control apparatus suitably employed for a motor vehicle with a diagonal braking hydraulic pressure supply system.

Figure 1:
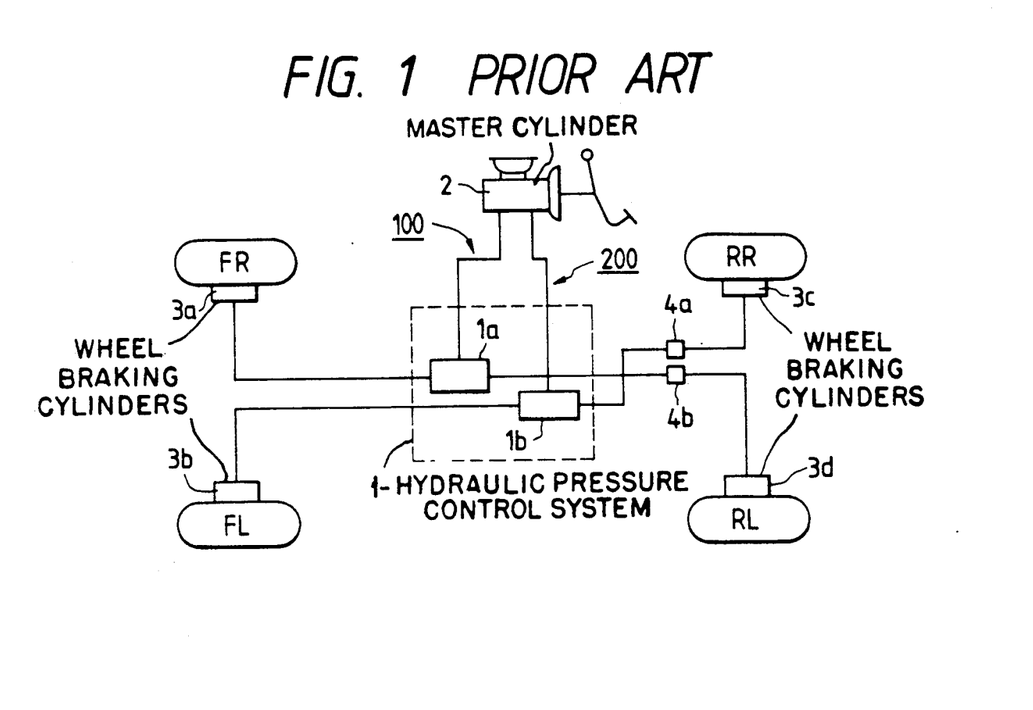
FIG. 1 is an illustration of a general diagonal hydraulic pressure braking system.

As one of braking hydraulic pressure supply systems for braking wheels of a front-engine and front-driven motor vehicle and the like is known a diagonal braking hydraulic pressure supply system, which is arranged such that, for example, a braking hydraulic pressure generated in a master cylinder is applied through a first hydraulic pressure supply passage to wheel braking cylinders for the front-left and rear-right wheels and further applied through a second hydraulic pressure supply passage to wheel braking cylinders for the front-right and rear-left wheels. That is, in FIG. 1 showing such a hydraulic pressure supply system for a two-channel (2ch) type anti-skid system, a hydraulic pressure produced by a master cylinder 2 in response to depression of a braking pedal of the motor vehicle is supplied through a hydraulic pressure supply passage 100 to a wheel braking cylinder 3a for the front-right wheel FR and a wheel braking cylinder 3d for the rear-left wheel RL and further supplied through another hydraulic pressure supply passage 200 to a wheel braking cylinder 3b for the front-left wheel FL and a wheel braking cylinder 3c for the rear-right wheel RR. In each of the hydraulic pressure supply passages 100 and 200 is provided a hydraulic pressure control device 1a or 1b for allowing execution of the two-channel anti-skid control, for example. In addition, at the rear-wheel side position of each of the hydraulic pressure supply passages 100 and 200 is provided a proportioning valve (P valve) 4a or 4b.

One problem in such a conventional braking arrangement relates to deterioration of the travelling stability and increase in braking distance, because the P valves 4a and 4b are of the characteristic-fixed type. That is, assuming that the P valve has a characteristic as indicated by a solid-line X in FIG. 2, the characteristic of the P valve is generally determined and designed so that the hydraulic pressure distribution between the front and rear wheels becomes adequate when the motor vehicle is running on the most ordinary, dry asphalt road surface, thereby allowing deterioration of the vehicle travelling stability and the braking efficiency in accordance with the states of the road surface and the tires. For example, in the case that a front-wheel driven vehicle runs on a snow-piled road, a winter-type tire such as spike tire is employed for the front wheel and a normal tire is employed for the rear wheel. In this case, the hydraulic pressure in the wheel braking cylinder for the front-wheel which is subjected to a greater friction with respect to the road surface is required to be more increased in order to shorten the braking distance of the motor vehicle.

Figure 2:
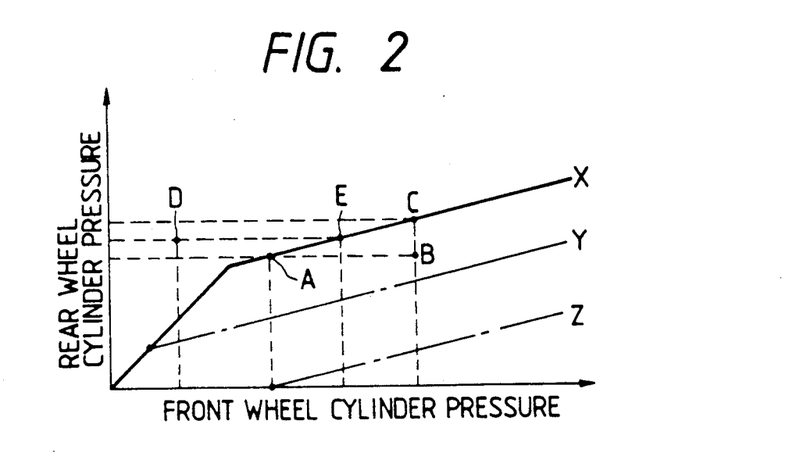
FIG. 2 is an illustration of the characteristic of a proportioning valve.

That is, in FIG. 2, under the condition that an adequate ratio of the hydraulic pressures for the front and rear wheels is obtained at a point B whereby the locking of the front and rear wheels can be prevented, according to a P valve, in the case that the hydraulic pressure corresponding to the point B is applied to the front wheel in order to shorten the braking distance, the hydraulic pressure corresponding to a point C is applied to the rear wheel to thereby result in deterioration of the travelling stability. On the other hand, when the hydraulic pressure corresponding to the point B is applied for the rear wheel, the hydraulic pressure indicated by a point A is applied for the front wheel to thereby result in lack of the braking force and excessive braking distance. Further, assuming that the motor vehicle is running on a friction-different road having different frictional coefficients for the front and rear wheels, it is preferable that the hydraulic pressure of the high-friction side wheel braking cylinder is controlled to become higher and the hydraulic pressure of the low-friction side wheel cylinder is set to be lower. However, this is difficult in the case of the 2ch anti-skid apparatus for the diagonal hydraulic pressure supply system. That is, when the right side of the motor vehicle is the high-friction side and the left-side thereof is the low-friction side, although it is preferable that, in the FR-RL system, the hydraulic pressure in the wheel braking cylinder for the front-right wheel FR is set to be relatively high and the hydraulic pressure in the wheel cylinder for the rear-left wheel RL is set to be relatively low, due to the above-mentioned characteristic of the conventional P valve, the braking force for the rear wheel becomes excessive or the braking force for the front wheel becomes insufficient. On the other hand, although it is preferable that, in the FL-RR system, the hydraulic pressure in the wheel braking cylinder for the front-left wheel is set to be relatively low and the hydraulic pressure in the wheel braking cylinder for the rear-right wheel is set to be relatively high (point D in FIG. 2), due to the P valve characteristic, the braking force for the rear-right wheel becomes insufficient to results in lengthening the braking distance when the the wheel braking pressure for the front-left wheel is set to be appropriate, whereas the braking force for the front-left wheel becomes excessive to result in locking tendency when the wheel braking cylinder pressure for the rear-right wheel is set to be adequate (point E in FIG. 2).

Thus, in the conventional 2ch type anti-skid control apparatus employed for the diagonal hydraulic pressure supply system, difficulty can be encountered to ensure the travelling stability and further shorten the braking distance under all conditions in which the motor vehicle is placed.

SUMMARY OF THE INVENTION

It is therefore an object of the present invention to provide a brake control apparatus in a diagonal braking hydraulic pressure supply system.

In accordance with the present invention, there is provided a brake apparatus for use in a motor vehicle having at least one front-side wheel and at least one rear-side wheel, comprising: a braking pressure supply system including a master cylinder of the vehicle for generating a braking pressure in response to operation of a braking pedal of the vehicle and wheel braking cylinders for applying braking forces to the front-side wheel and rear-side wheel, the braking pressure supply system including first and second supply passages so that the braking pressure generated by the master cylinder is supplied through the first supply passage to the front-side wheel braking cylinder and further supplied through the second supply passage to the rear-side wheel braking cylinder; braking pressure adjusting means provided in the braking pressure supply system for adjusting the braking pressure to be applied to the front-side and rear-side wheel braking cylinders in accordance with a drive signal; first sensor means for sensing a speed of the front-side wheel to generate a first detection signal indicative of the sensed speed of the front-side wheel; second sensor means for sensing a speed of the rear-side wheel to generate a second detection signal indicative of the sensed speed of the rear-side wheel; proportioning valve means provided in the second supply passage of the braking pressure supply system for controlling the braking pressure to be applied to the rear-side wheel braking cylinder in accordance with a control signal so as to vary the ratio of the braking pressure to the rear-side wheel braking cylinder with respect to the braking pressure to be applied to the front-side wheel braking cylinder; and electronic control means responsive to the first and second detection signals from the first and second sensor means to produce the control signal to the proportioning valve means and to control the braking pressure adjusting means, the electronic control means including: first lock-tendency calculation means for calculating a lock tendency of the front-side wheel on the basis of the first detection signal; second lock-tendency calculation means for calculating a lock tendency of the rear-side wheel on the basis of the second detection signal; parameter calculation means for obtain a parameter corresponding to the difference between the front-side wheel and rear-side wheel lock tendencies calculated in the first and second lock-tendency calculation means; command-value calculation means for calculating a command value by integration of the parameter obtained by the parameter calculation means; first output means for outputting to the braking pressure adjusting means the drive signal determined in accordance with the lock tendencies of the front-side and rear-side wheels; and second output means for outputting to the proportioning valve means the control signal determined in accordance with the command value calculated by the command-value calculation means.

Preferably, the electronic control means further includes vehicle-speed estimating means for estimating a speed of the motor vehicle on the basis of the first and second detection signals from the first and second sensor means, and said first lock-tendency calculation means comprising means for calculating a wheel speed $V_F$ and deceleration $G_F$ of the front-side wheel on the basis of the first detection signal, means for determining a front-wheel target speed $V_{STF}$ and front-wheel target deceleration $G_{STF}$ on the basis of the estimated vehicle speed, means for obtaining a lock parameter $L_{PF}$ in accordance with an equation $L_{PF}=K1(V_F-V_{STF})+K2(G_F-G_{STF})$ where K1 and K2 are constants and means for calculating the lock tendency on the basis of the obtained lock parameter $L_{PF}$, and further the second lock-tendency calculation means comprising means for calculating a wheel speed $V_R$ and deceleration $G_R$ of the rear-side wheel on the basis of the first detection signal, means for determining a rear-wheel target speed $V_{STR}$ and rear-wheel target deceleration $G_{STR}$ on the basis of the estimated vehicle speed, means for obtain a lock parameter $L_{PR}$ in accordance with an equation $L_{PR}=K1(V_R-V_{STR})+K2(G_F-G_{STF})$ and means for calculating the lock tendency on the basis of the obtained lock parameter $L_{PR}$.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 3:
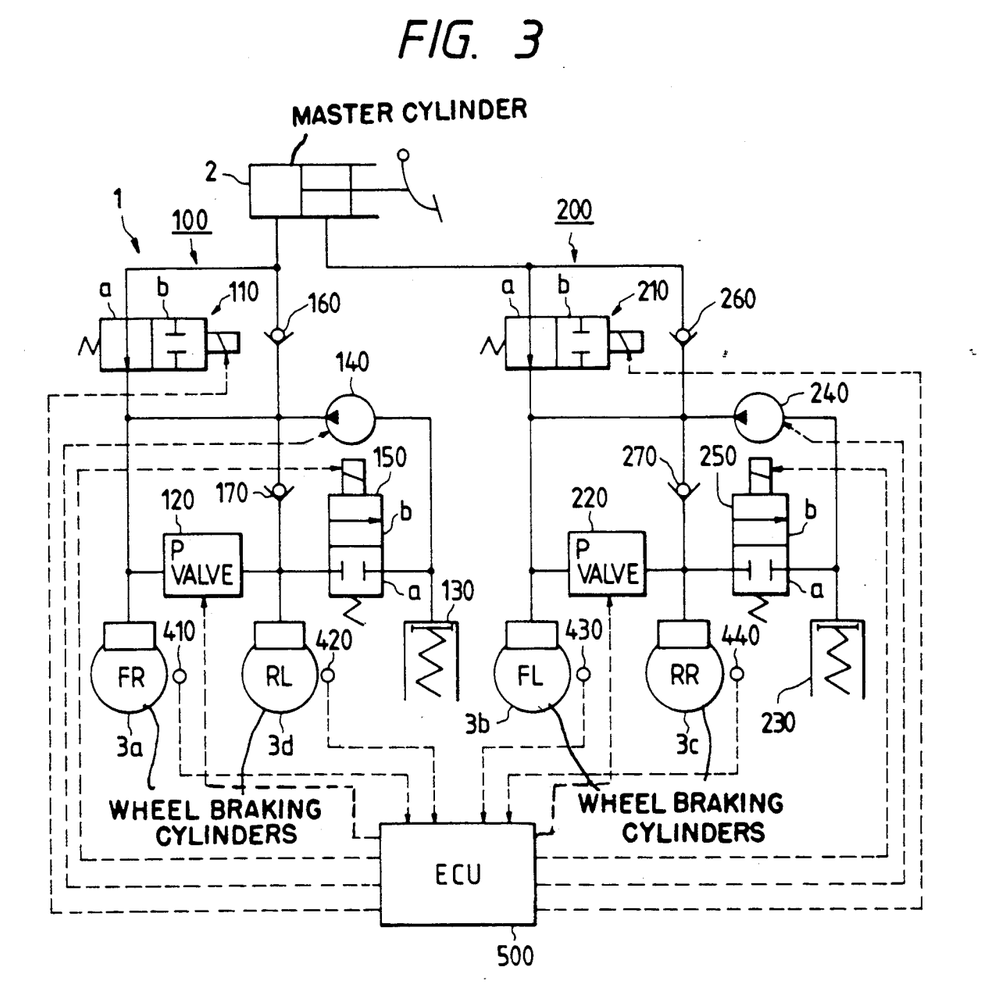
FIG. 3 is an illustration of an arrangement of a brake control apparatus according to an embodiment of the present invention.

Referring now to FIG. 3, there is illustrated an arrangement of a brake control apparatus according to an embodiment of the present invention which is incorporated into a diagonal braking hydraulic pressure supply system for use in a motor vehicle having front wheels FR, FL and rear wheel RR, RL. In FIG. 3, illustrated at numeral 2 is a master cylinder which generates a hydraulic pressure in response to operation of a braking pedal of the motor vehicle, the hydraulic pressure from the master cylinder 2 being supplied to two hydraulic pressure systems designated by numerals 100 and 200. The first hydraulic pressure system 100 is provided in order to supply the hydraulic pressure to a wheel braking cylinder 3a for the front-right wheel FR and a wheel braking cylinder 3d for the rear-left wheel RL, whereas the second hydraulic pressure system 200 is provided to supply the hydraulic pressure to a wheel braking cylinder 3b for the front-left wheel FL and a wheel braking cylinder 3c for the rear-right wheel RR. Illustrated at numeral 500 is an electronic control unit (ECU) comprising a microcomputer equipped with a central processing unit (CPU), a read-only memory (ROM), a random access memory (RAM) and others. The electronic control unit (ECU) receives signals indicative of wheel speeds from wheel speed sensors 410, 420, 430 and 440 for the respective wheels FR, RL, FL and RR and supplies control signals to solenoid-operated two-position valves 110, 150, 210, 250, piezo-pumps 140, 240, and variable proportioning (P) valves 120, 220, which will be described hereinafter. Numerals 160, 170, 260, 270 are check valves for quickly decreasing the hydraulic pressures in the respective wheel braking cylinders 3a, 3b, 3c, 3d in response to release of the braking pedal by the vehicle driver irrespective of execution of the anti-skid control.

The first and second hydraulic pressure systems 100 and 200 have the substantially same structure, and therefore a description will be made hereinbelow in terms of only the second hydraulic pressure system 200.

The two-position valve 210 allows supplying the hydraulic pressure from the master cylinder 2 to the respective wheel braking cylinders 3b and 3c when taking a first position a, and shuts off the communication between the master cylinder 2 and the downstream hydraulic pressure passage when taking a second position b. With the two-position valve 210 being switched to the second position b, the two-position valve 250 takes a first position a so as to cut off the communication between the respective wheel braking cylinders 3b, 3c and a reservoir 230. Further, in response to operation of the piezo-pump 240, a pressure-increasing mode is taken so as to supply the hydraulic pressure to the respective wheel braking cylinders 3b, 3c. On the other hand, in response to no operation of the piezo-pump 240, a pressure-maintaining mode is taken so that the hydraulic pressures in the respective wheel braking cylinders 3b, 3c are kept constant. When both the two-position valves 210 and 250 are at the second position b, a pressure-decreasing mode is taken so that the hydraulic pressures in the respective wheel braking cylinders 3b, 3c flow out into the reservoir 230.

Here, in this embodiment, the braking pressure accumulated in the reservoir 230 by means of the piezo-pump 240 is supplied under pressure to the downstream side of the two-position valve 210. Thus, due to supply of a current to the variable P valve 220, as indicated by an alternate long and short dash line Z in FIG. 2, the pressure is not supplied to the rear-wheel side braking cylinder until the pressure in the front-wheel side braking cylinder reaches a predetermined pressure, and in this state, the two-position valves 210 and 250 are respectively switched to the pressure-decreasing mode and the piezo-pump 240 is operated, whereby only the pressure in the wheel braking cylinder 3c for the rear-right wheel RR is decreased and the pressure in the wheel braking cylinder 3b for the front-left wheel FL is increased.

Figure 4:
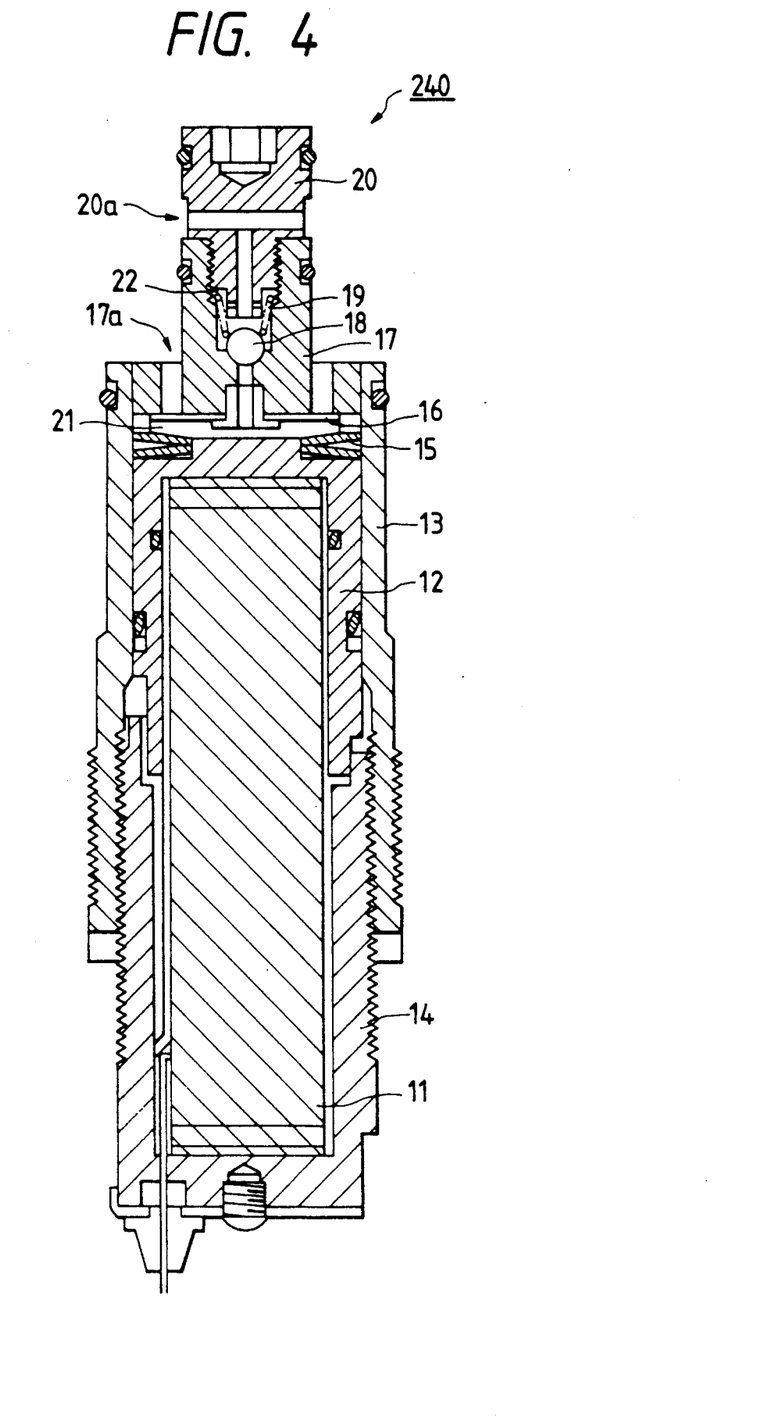
FIG. 4 shows an arrangement of a piezo-pump used in the FIG. 3 brake control apparatus.

FIG. 4 is an illustration of an arrangement of the piezo-pump 240. In FIG. 4, illustrated at numeral 11 is a laminated piezo-stack which is constructed by laminating piezoelectric elements such as zirconate titanate (PZT) elements so as to be expanded and contracted in the directions of its own axis in response to application of a high voltage (for example, 500V,-200V). In this embodiment, the expansion and constraction amount of the piezo-stack 11 is about 60 micrometers. Numeral 12 is a piston which is disposed so as to cover the piezo-stack 11 and numeral 13 is a cylinder in which the piston 12 slides. The cylinder 13 and the piezo-stack 11 are held by a jack 14. Numeral 15 represents a spring for applying, in advance, a pressure to the piezo-stack 11 so as to prevent the self-breakage of the piezo-stack 11 and further to bias the piston 12 toward the piezo-stack 11. Numerals 21 designates a pump chamber for intaking an operating oil and discharging it after compression, numeral 16 depicts a valve suction for opening and closing the operating oil inlet to the pump chamber 21, and numeral 18 depicts a ball for opening and closing the operating oil outlet from the pump chamber 21. Further, numeral 17 represents a body valve which is arranged for forming a flow passage of the operating oil and which acts as a seat portion for the ball 18, numeral 19 designates a spring for pressing the ball 18 against the seat portion of the body valve 17, numeral 20 denotes a stopper in which a flow-out passage of the operating oil from the pump chamber 21 is formed and which is arranged so as to hold the spring 19, the ball 18 and others, and numeral 22 is an output chamber from which a high-pressure operating oil flows out. An operating oil inlet 17a formed in the body valve 17 is coupled to the reservoir 230 and an operating oil outlet 20a formed in the stopper 20 is coupled to the downstream side of the two-position valve 210.

Figure 5:
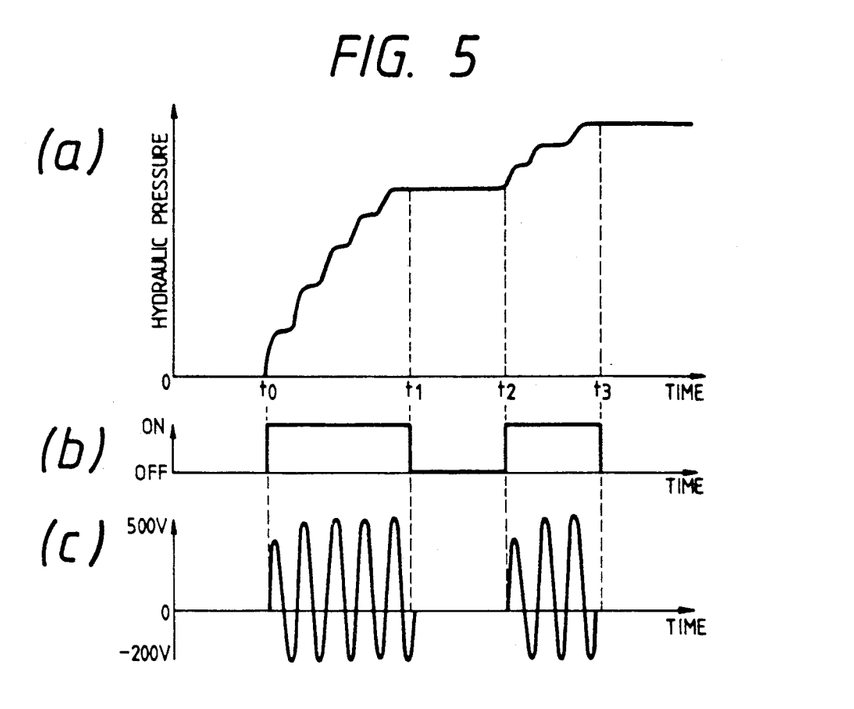
FIG. 5 is a timing chart for describing the operation of the FIG. 4 piezo-pump.

A description will be made hereinbelow in terms of operation of the piezo-pump 240 with the above-described arrangement. In response to application of the voltage of −200V to the piezo-stack 11, the piezo-stack 11 is contracted in its longitudinal directions whereby the volume of the pump chamber 21 is increased so as to lower there pressure therein. Thus, the operating oil stored through the inlet 17a in the reservoir 230 goes into the pump chamber 21. Secondly, in response to application of a voltage of 500V to the piezo-stack 11, the piezo-stack 11 is expanded in its longitudinal directions, whereby the volume of the pump chamber 21 is decreased to heighten the pressure so that the ball 18, which is brought into contact with the seat portion of the body valve 17, is pressed to be opened to cause the operating oil to be discharged into the output chamber 22. Thereafter, with the contraction of the piezo-stack 11, the same operation is repeated to establish the pump action. The advantage of this pump is ease of the intermittent action because the operating speed of the piezo-stack 11 is extremely high (about 1 msec). That is, as illustrated in (b) of FIG. 5, when a pressure-increasing signal indicative of the state that the pressures in the wheel braking cylinders 3b, 3c are increased is turned on at a time to, the ECU 500 supplies a sine-wave drive signal (for example, a frequency of 125 Hz), as illustrated in (c) of FIG. 5, to the piezo-stack 11. Thus, the hydraulic pressure in the output chamber 22 is increased as illustrated in (a) of FIG. 5. When the pressure-increasing signal is turned of at a time t1, the drive signal for the piezo-stack 11 is turned off so as to stop the pump action.

Here, although the conventional motor pump provides problems that the consumption energy and the generation noise are large because the motor should be always operated, since the piezo-pump 240 of this embodiment, as described above, allows the intermittent operation to eliminate the two problems in terms of the consumption energy and generation noise.

Particularly, for eliminating the generation noise, in this embodiment, the drive signal for the piezo-stack 11 is arranged to be a sine wave signal. That is, since the response of the piezo-stack 11 to the drive signal is extremely quick, in the case that, for example, a rectangular-wave drive signal is supplied to the piezo-stack 11, the operating portions of the pump 240 cannot follow the movement of the piezo-stack 11, whereby the efficiency of the pump function is lowered or the oil-impact noise is generated due to the high-speed movement of the piezo-stack 11.

A description will be made hereinbelow on the basis of the comparison of the sine-wave drive signal for the piezo-stack 11 with the rectangular-wave drive signal therefor.

Figure 6A:
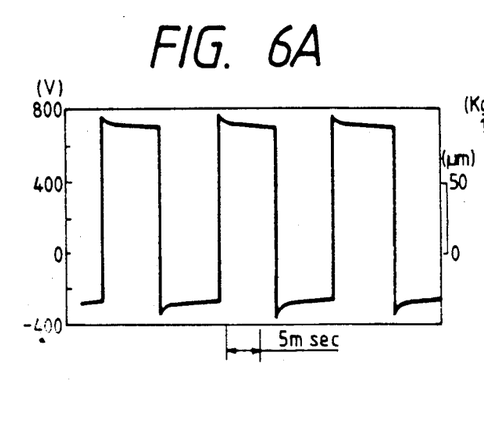
FIGS. 6A and 6B are illustrations for describing the piezo-pump performance obtained when the piezo-pump is driven by a rectangular-wave drive signal.
Figure 6B:
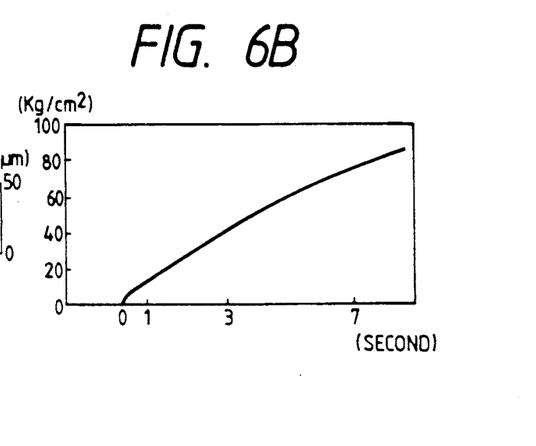
Figure 7A:
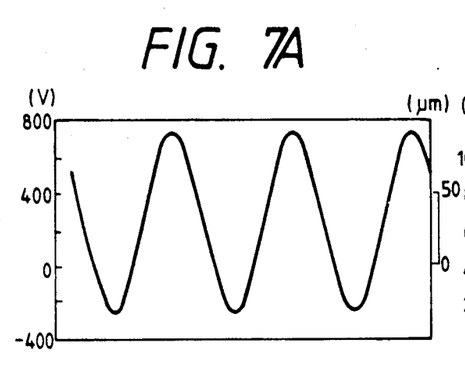
FIGS. 7A and 7B are illustrations for describing the performance attained when the piezo-pump is operated by a since-wave drive signal.
Figure 7B:
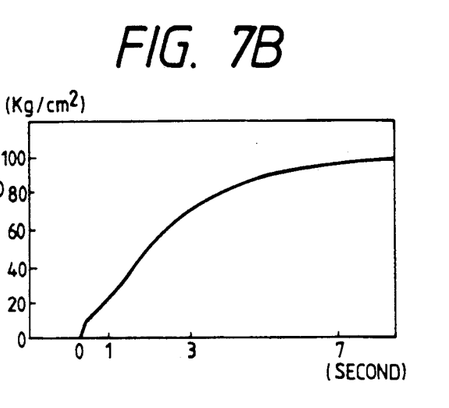

In the case of driving the piezo-stack 11 by a rectangular-wave drive signal (a frequency of 60 Hz) as shown in FIG. 6A, the pressure in the output chamber 22, as illustrated in FIG. 6B, is increased so as to be about 15 kg/cm$^2$ after elapse of one second from the drive start, be about 30 kg/cm$^2$ after elapse of 2 seconds and be about 80 kg/cm$^2$ after elapse of 7 seconds. On the other hand, in the case of driving the piezo-stack 11 by a sine-wave drive signal (a frequency of 60 Hz) as illustrated in FIG. 7A, the pressure in the output chamber 22 is increased so as to be about 25 kg/cm$^2$ after elapse of one second, be about 50 kg/cm$^2$ after elapse of 2 seconds and be about 100 kg/cm$^2$ after elapse of 7 seconds. In accordance with these data results, as compared with the rectangular-wave drive signal, the since-wave drive signal increases the driving performance of the piezo-stack 11. In this cause, in the case of the rectangular wave drive signal, the change-over is in a moment effected from the positive peak voltage to the negative peak voltage or vice versa. However, when the piezo-stack 11 is switched from the expansion state to the contraction state or vice versa, there is generated a time lag. In addition, even in the case of the switching of the piezo-stack 11 from the expansion state to the contraction state, the piston 12 cannot immediately follow the movement of the piezo-stack 11, whereby a time lag is produced until the volume of the pump chamber 21 is enlarged after the piezo-stack 11 enters into the contraction state. This time lag causes lowering the pump efficiency. On the other hand, in the case the drive signal for the piezo-stack 11 is a since-wave drive signal, since the voltage applied to the piezo-stack 11 varies slowly, such a time lag can be reduced so as to improve the pump efficiency.

Figure 8:
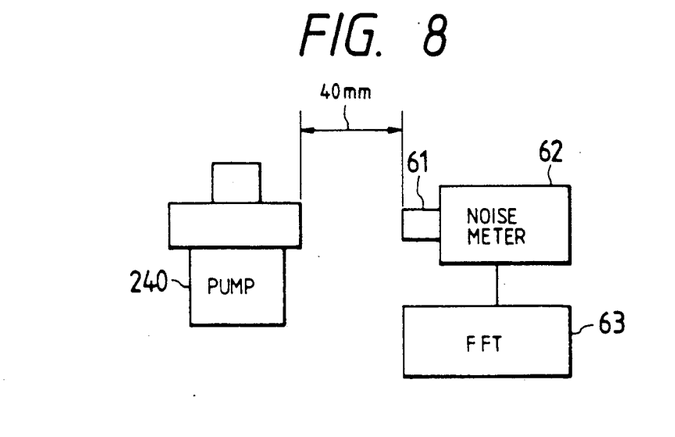
FIG. 8 is an illustration of a measuring apparatus for measuring noises generated by the piezo-pump.

Secondly, a description will be made in terms of the measurement results of the noises generated in the cases of the rectangular-wave drive signal and the sine-wave drive signal. in FIG. 8 showing a noise measuring device, numeral 61 is a microphone (4145 type) manufactired by B & K Co., Ltd. which microphone is disposed at the position apart away by 40 mm from a side surface of the piezo-stack 11. Numeral 62 represents a sound-level meter (2203 type) manufactured by B & K Co., Ltd. and numeral 63 designates a FFT analyzer (CF-910 type) manufactured by Ono Sokki Co., Ltd.

Figure 9A:
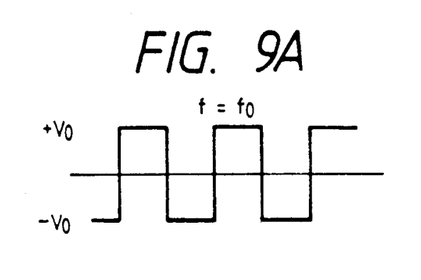
FIGS. 9A and 9B are waveform diagrams showing a rectangular-wave drive signal and a sine-wave drive signal.
Figure 9B:
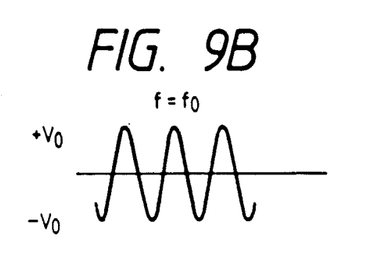
Figure 10A:
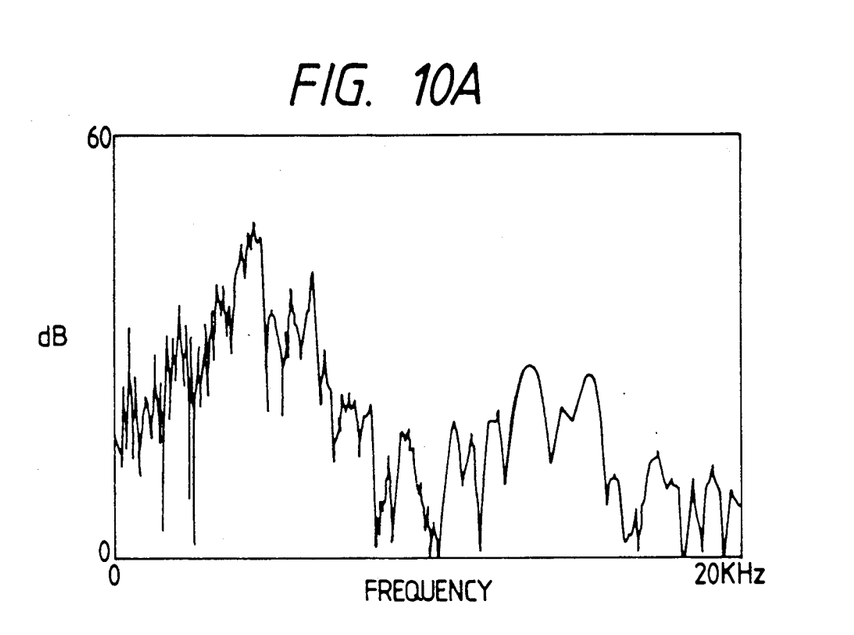
FIGS. 10A and 10B show the measurement results of noises generated by operation of the piezo-pump.
Figure 10B:
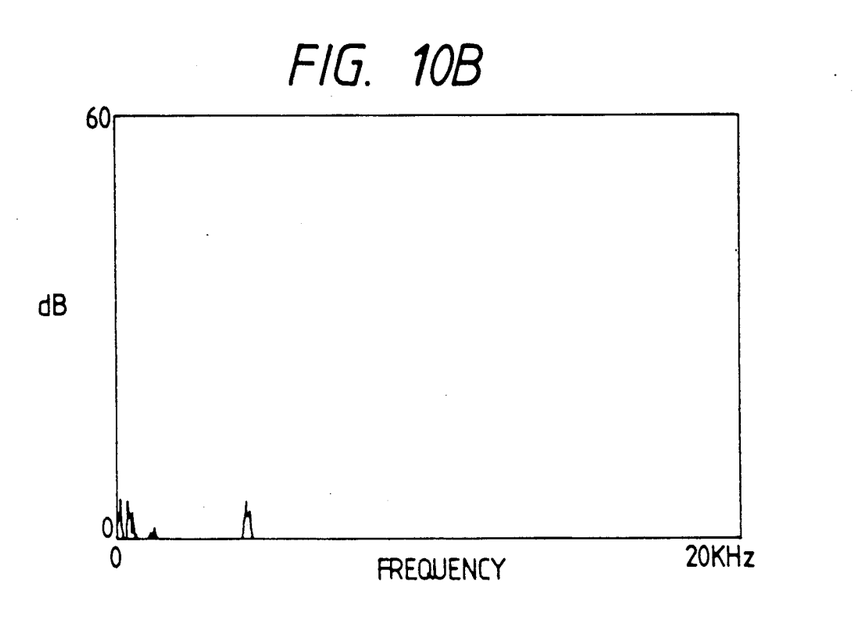

FIGS. 10A and 10B show the measurement results (using the above-mentioned measuring devise) of noises generated in the cases of driving the piezo-pump 240 by the rectangular-wave signal and sine-wave signal whose voltages are ±Vo as illustrated in FIGS. 9A and 9B and whose frequencies are fo as shown in the same figures. FIG. 10A shows the sound pressure level with respect to frequencies in the case of driving the piezo-pump 240 with the rectangular-wave signal. In this case, the noise level is 84 dB. On the other hand, FIG. 10B shows the sound pressure level with respect to frequencies in the case of driving the piezo-pump 240 with the since-wave signal. In this case, the noise level is 53 dB. As obvious from these measurement results, as compared with the rectangular-wave driving, in the case of the sine-wave signal driving, since the voltage applied to the piezo-stack 11 varies slowly, the expansion and contraction movements become slow, thereby reducing the oil-impact noises and others to extremely decrease the noises.

The operation of this embodiment with the above-mentioned arrangement will be described hereinbelow with reference to drawings. Here, the basic control of this system is the system-distinction low-select control which takes into account the P-valve control.

Figure 11:
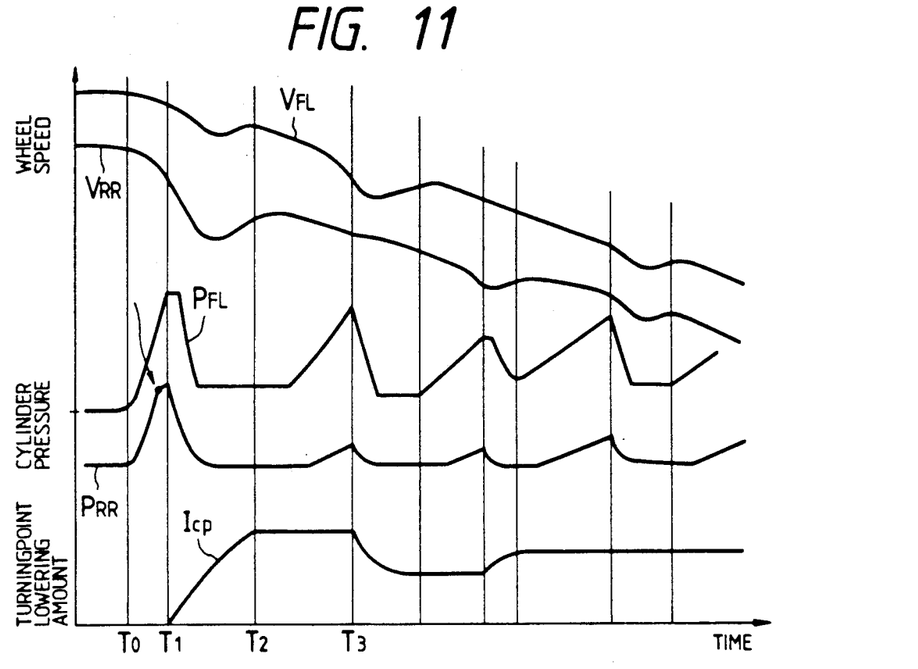
FIG. 11 is a time chart for describing variations of wheel speeds, wheel braking cylinder pressures and turning-point lowering amount.

Let it be assumed that the road surface is a snow-piled road and the front-side wheels and the rear-side wheels have spike tires and normal tires, respectively. FIG. 11 illustrates variations of wheel speeds and others in accordance with the P-valve control in the case of such a state. In FIG. 11, character $V_{FL}$ represents the front-left wheel speed, character $V_{RR}$ designates the rear-right wheel speed, $P_{FL}$ depicts the hydraulic pressure in the wheel braking cylinder for the front-left wheel, $P_{RR}$ denotes the hydraulic pressure in the wheel braking cylinder for the rear-right wheel, and character Icp is the P-valve turning-point lowering amount. Here, in accordance with increase in the P-valve turning-point lowering amount Icp, as illustrated by the characteristic lines X to Z in FIG. 2, the turning-point position in the P-valve characteristic is lowered so as to enlarge the difference between the hydraulic pressures in the wheel braking cylinders for the front and rear wheels.

In FIG. 11, when the braking operation is started at a time To to increase the respective wheel cylinder hydraulic pressures $P_{FL}$ and $P_{RR}$, the wheel speeds $V_{RR}$ and $V_{FL}$ are started to be decreased in response to the increase of the the respective wheel cylinder hydraulic pressures $P_{FL}$ and $P_{RR}$. Since the basic control of this system is the low-select control, at a time Tl, the ECU 500 outputs pressure-decreasing commands to the two-position valves 210 and 250 on the basis of the speed $V_{RR}$ and deceleration $G_{RR}$ of the rear-right wheel RR whose lock-tendency is relatively high to result in decrease in the respective wheel braking cylinder hydraulic pressures $P_{FL}$ and $P_{RR}$. In accordance with this operation, the respective wheel speeds $V_{FL}$ and $V_{RR}$ are restored between the time Tl and a time T2. Here, the ECU 500, during this pressure-decreasing, always monitors the magnitudes of the lock-tendencies of the front and rear wheels in accordance with the following formulas which are referred to as lock parameters.

front-wheel lock parameter Lpf $= K1 \cdot (V_{FL} - V_{STF}) + K2(G_{FL} - G_{STF})$ rear-wheel lock parameter Lpr $= K1 \cdot (V_{RR} - V_{STR}) + K2(G_{RR} - G_{STR})$ where $V_{STF}$ represents a front-wheel control target speed which is set to be 80% of the vehicle speed, for example, $V_{STR}$ designates a rear-wheel control target speed which is set to be 95% of the vehicle speed, and $G_{FL}$, $G_{RR}$, $G_{STF}$, $G_{STR}$ respectively the time-differentiated values of wheel speeds $V_{FL}$, $V_{RR}$, $V_{STF}$, $V_{STR}$.

After the calculation of the front and rear wheel lock parameters Lpf and Lpr, a channel parameter Cp showing the difference between the lock tendencies is calculated in accordance with the following formulas and the command value to the solenoid of the P valve 220 is calculated by integrating this value Cp during the pressure-decreasing and by multiplying the integrated value by a predetermined constant. That is, channel parameter $Cp = -Lpf + Lpr$ the command value $Icp(n) = ICP(n-1) + K3 \cdot CP(n)$
$(\because Icp(n) = 0)$ Between the times T1 and T2, since the rear-wheel lock tendency is greater than the front-wheel lock tendency, the command value to the solenoid of the P valve 220, i.e., the P valve turning-point lowering amount Icp(n), gradually becomes greater, and the pressure-decreasing is performed with the ratio of the rear-wheel braking cylinder hydraulic pressure $P_{RR}$ to the front-wheel braking cylinder hydraulic pressure $P_{FL}$ being decreased. Thus, the difference between the lock tendencies of the front and rear wheels is made smaller. Further, during the pressure-increasing period from the time T2 to a time T3, the braking hydraulic pressures are applied to the front and rear wheel braking cylinders in accordance with the P valve turning-point lowering amount Icp which has been set during the pressure-decreasing period from the time T1 to the time T2.

On the other hand, when, at the time T3, the front wheel lock tendency becomes greater, the value of the P valve turning-point lowering amount Icp is made smaller so that the pressure-decreasing is performed with the ratio of the rear-wheel braking cylinder hydraulic pressure $P_{RR}$ to the front-wheel braking cylinder hydraulic pressure $P_{FL}$ being made greater. In addition, according to this embodiment, the magnitudes of the lock tendencies of the front and rear wheels are continuously monitored during the pressure-decreasing period so that the magnitudes thereof become equal to each other, and therefore the braking force distribution for the front and rear wheels can be controlled to be optimal irrespective of variation of the running road surface state.

Here, a description will be made hereinbelow with reference to FIG. 2 in terms of the reason that, as illustrated in FIG. 11, the front-wheel braking cylinder hydraulic pressure $P_{FL}$ is maintained for a predetermined time period at the initial time of the pressure-decreasing control which is started at the time T1. In FIG. 2, when the turning-point lowering amount Icp=0, the distribution point for the front and rear wheel braking cylinder pressures $P_{FL}$ and $P_{RR}$ appears on the characteristic line X. When at the time T1 the pressure-decreasing control is started and further the turning-point lowering amount Icp is started to be increased, the turning-point of the P valve 220 is lowered, thereby resulting in the characteristic line Y. At this time, the decreasing of the front-wheel braking cylinder hydraulic pressure $P_{FL}$ is limited until the rear-wheel braking cylinder hydraulic pressure $P_{RR}$ is decreased up to the pressure which follows this characteristic line. Thus, as described above, the wheel braking cylinder hydraulic pressure $P_{FL}$ is maintained for a predetermined time period at the initial time of the pressure-decreasing control.

Further, since, as described above, the turning-point lowering amount Icp(n) has an integration factor, it gradually approaches a value suitable for the running road surface. Here, although the turning-point lowering amount Icp(n) is determined so that its initial value Icp(o) is zero, there is the possibility that the initial value Icp(o) is preferably set to be Icpmax (the maximum value of Icp) under a certain road surface state. This will be described hereinbelow.

Figure 12A:
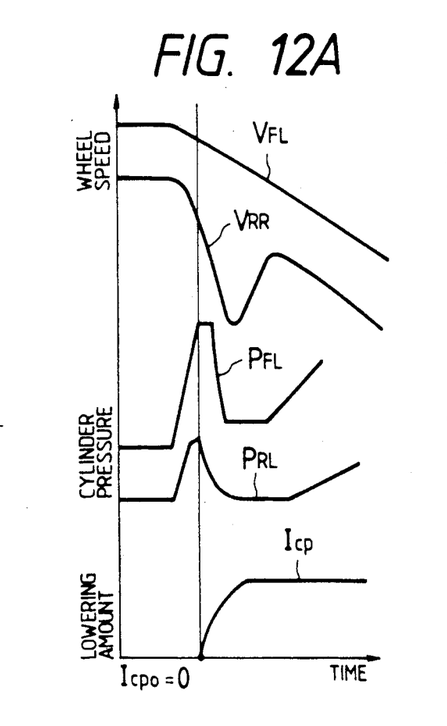
FIGS. 12A and 12B are timing charts for describing initial proportioning valve control.
Figure 12B:
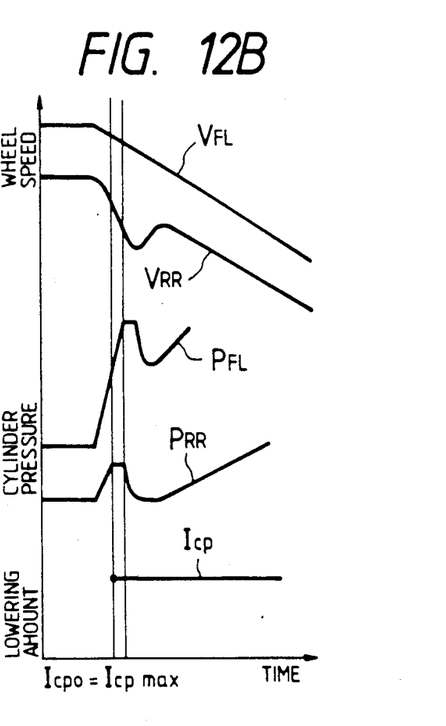

FIGS. 12A and 12B show the wheel speeds $V_{FL}$, $V_{RR}$, the wheel braking cylinder hydraulic pressures $P_{FL}$, $P_{RR}$ and the P-valve turning-point lowering amount Icp at the time of a rapid braing operation when the motor vehicle is running on a high-friction road surface such as a dried asphalt surface. Since the high-friction road surface causes the deceleration of the motor vehicle to be great, the so-called nose-dive easily takes place due to the load being shifted to the front wheel side. In this case, the load for the rear wheel is extremely reduced because of rising of the rear wheel and hence the rear wheel tends to be locked exceedingly. Thus, the lock tendency of the rear wheel becomes high and the channel parameter Cp representing the difference between the lock tendencies of the front and rear wheels also becomes great. If under such a case the turning-point lowering amount Icp is determined when entering into the pressure-decreasing control, as illustrated in FIG. 12A, the rear wheel speed $V_{RR}$ is exceedingly lowered and the pressure-decreasing due to the speed lowering, causes lengthening the braking distance and occurrence of pitching so as to deteriorate the stability of the motor vehicle on the braking operation.

Accordingly, as shown in FIG. 12B, the turning-point lowering amount Icp of the P valve 220 is in advance set to be the maximum value Icpmax before execution of the pressure-decreasing control (this will hereinafter be referred to as initial P-valve control), whereby it is possible to present the great lowering of the rear wheel speed $V_{RR}$. According to this control, the excessive decreasing of the front-wheel braking cylinder hydraulic pressure $P_{FL}$ is not required and hence the braking distance and stability are improved. Here, the determination of execution of the initial P-valve control may be made when the value of the channel parameter Cp exceeds a predetermined threshold before start of the pressure-decreasing control.

The above-mentioned initial P-valve control is similarly effective in the case of braking when the motor vehicle is running on a road surface having different friction coefficients for the left and right wheels. A description will be made in terms of this case with reference to FIGS. 13A and 13B.

Figure 13A:
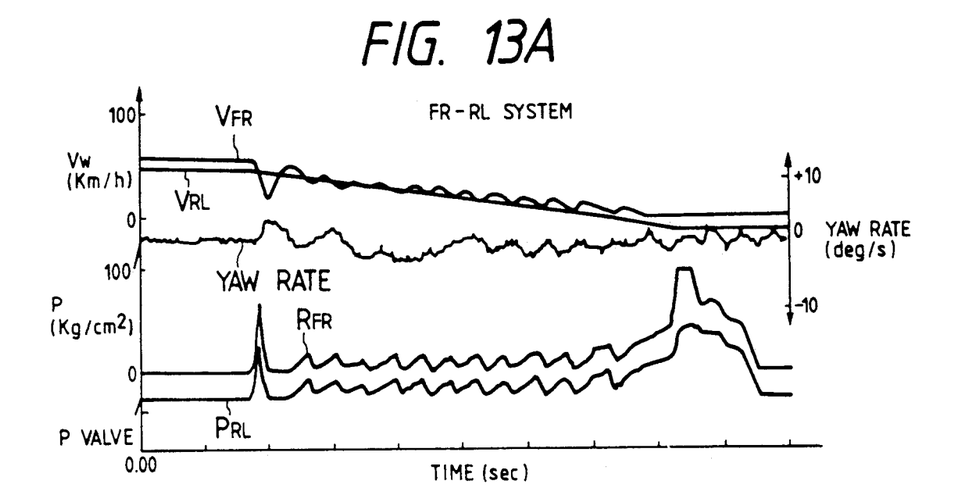
FIGS. 13A and 13B are timing charts for describing control executed when a motor vehicle is running on a friction-different road surface.
Figure 13B:
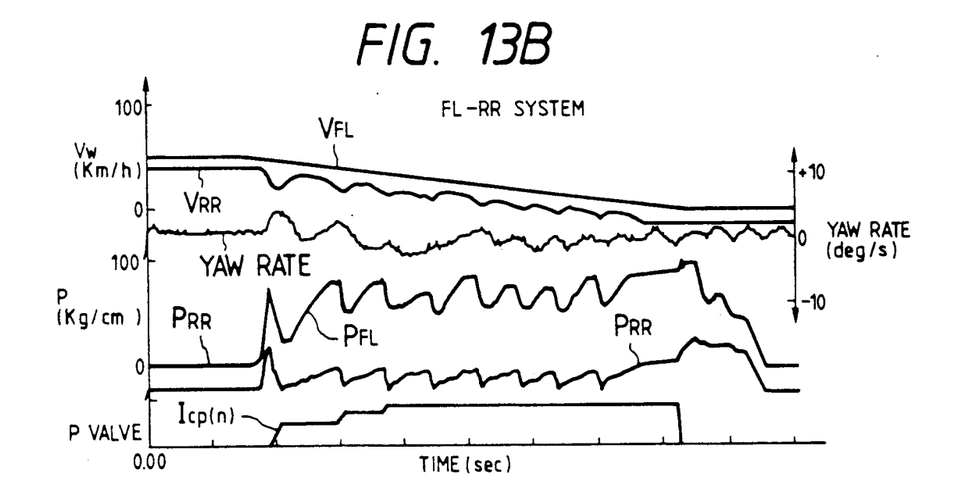

Let it be assumed that the right wheel is advancing on the low-friction road surface and the left wheel is advancing on the high-friction road surface. FIGS. 13A and 13B, with respect to both the FR-RL and FL-RR systems, shows the front and rear wheel speeds $V_{FR}$, $V_{RL}$, $V_{RR}$, $V_{FL}$, and the yawrate $\theta$, the front and rear wheel braking cylinder hydraulic pressures $P_{FR}$, $P_{RL}$, $P_{FL}$, $P_{RR}$, and the turning-point lowering amount Icp when the braking operation is performed under such a road surface condition. In the FR-RL system shown in FIG. 13A, in accordance with increase in the wheel braking cylinder hydraulic pressure, the speed $V_{FR}$ of the front-right wheel which is running on the low-friction road surface is greatly lowered to make great the lock tendency, while the lock tendency of the rear-left wheel which is running on the high-friction road surface is kept to be low. Thus, with the low-select control, the braking pressure applied to this system is controllable on the basis of the wheel speed $V_{FR}$ and wheel acceleration $G_{FR}$ of the front-right wheel. In this case, since the characteristic of the P valve 220 is not required to be changed, the P-valve turning-point lowering amount Icp becomes zero.

On the other hand, in the FL-RR system illustrated in FIG. 13B, in accordance with increase in the wheel braking cylinder hydraulic pressure, the lock tendency of the front-left wheel which is running on the low-friction road surface becomes great, while the lock tendency of the front-left wheel is extremely low. Thus, the turning-point lowering amount Icp becomes great as illustrated in FIG. 13B.

Accordingly, if the initial P-valve control is executed before the wheel speed $V_{RR}$ is extremely lowered, as described above, it is possible to shorten the braking distance and improve the stability.

Figure 14A:
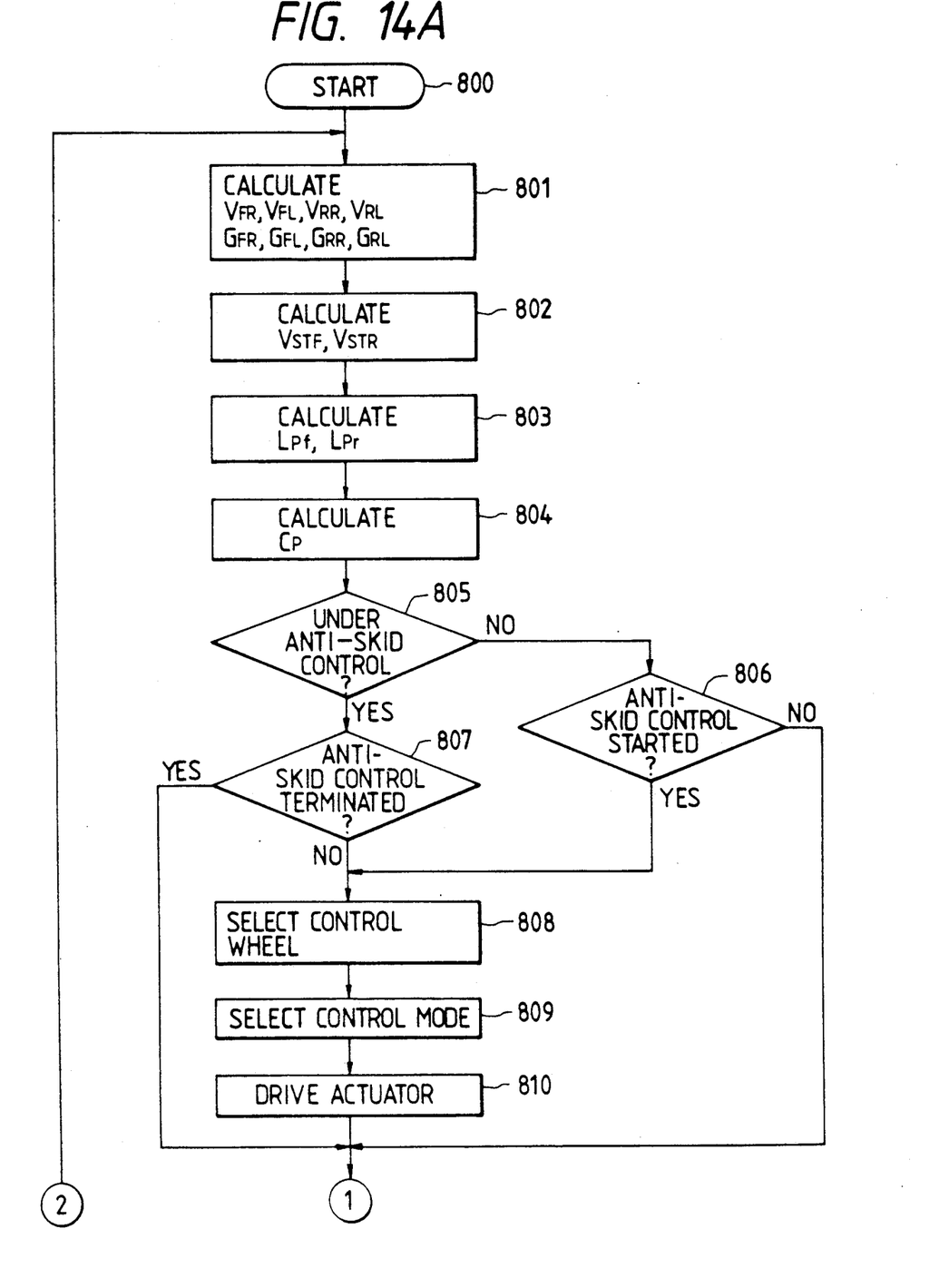
FIGS. 14A and 14B are flow charts for describing processes performed in the embodiment of this invention.
Figure 14B:
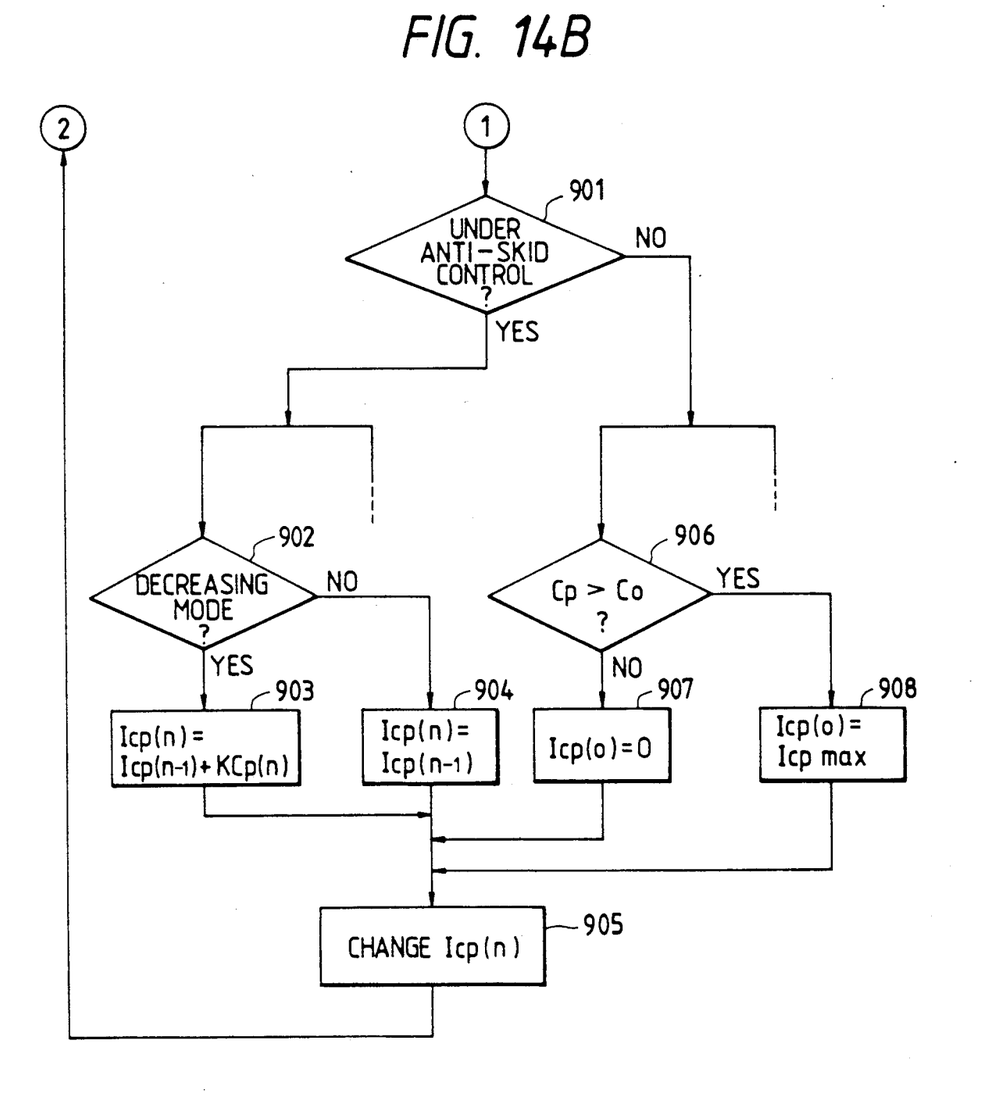

FIGS. 14A and 14B are flow charts for realizing the aforementioned control, which will be executed repeatedly at an interval of 8 ms, for example. In FIGS. 14A and 14B, a step 801 is first executed to read the speed signals from the respective wheel speed sensors 410 to 440 so as to calculate the speeds $V_{FR}$, $V_{FL}$, $V_{RR}$, $V_{RL}$ and the acelerations $G_{FR}$, $G_{FL}$, $G_{RR}$, $G_{RL}$. A step 802 follows to estimate the vehicle speed Vso on the basis of the calculation results in the step 801 and further calculate the front and rear wheel control target speeds $V_{STF}$ and $V_{STR}$ by multiplying the estimated vehicle speed Vso by predetermined rates. In a step 803, the respective lock parameters Lpf and Lpr are calculated on the basis of the calculation results in the steps 801 and 802, followed by a step 804 to calculate the channel parameters Cp of the respective systems on the basis of the front and rear wheel lock parameters Lpf and Lpr calculated in the step 803.

In a step 805, it is checked whether the motor vehicle is on the anti-skid control. If so, control goes to a step 807 to check whether or not the anti-skid control is terminated. If the answer of the step 807 is "NO", control goes to a step 808 to perform the comparison between the front and rear wheel lock parameters Lpf and Lpr in the respective systems to select, as the wheel to be controlled, the wheel whose lock parameter Lp is greater. A step 809 follows to select the anti-skid control mode for each of the systems on the basis of the lock parameter Lp of the controlled wheel which is selected in the step 808, followed by a step 810 to operate an actuator of the system in accordance with the selected mode.

On the other hand, if the answer of the step 805 is "NO", control goes to a step 806 to check, on the basis of the lock parameter of each wheel, whether or not the anti-skid control is to be started. If not, control goes to a step 901 to again check whether the motor vehicle is under the anti-skid control. If so, control goes to a step 902 to check whether the present anti-skid control mode is the pressure-decreasing mode. If it is the pressure-decreasing mode, control advances to a step 903 to calculate the P-valve turning-point lowering amount Icp(n) in the present period. If not, control proceeds to a step 904 to determine the turning-point lowering amount Icp(n−1) in the previous period as the present turning-point lowering amount Icp(n).

Furthermore, when the decision of the step 901 is that the motor vehicle is not under the anti-skid control, control goes to a step 906 to compare the channel parameter Cp with a predetermined threshold Co. In this comparison result, if the channel parameter Cp is greater than the predetermined threshold Co, the determination is made such that the lock tendency of the rear wheel is great and it is required to lower the turning-point of the P valve before start of the pressure-decreasing control, and hence the initial value Icp(o) of the turning-point lowering amount is set to be the maximum value Icpmax. On the other hand, as a result of the comparison in the step 906, if the threshold Co is greater than the channel parameter Cp, control goes to a step 907 to set the initial value Icp(o) of the turning-point to zero.

A step 905 is provided to output to the solenoid of the P valve the turning-point lowering amount Icp(n) determined in the steps 903, 904, 907 and 908 and to vary the turning-point of the P valve.

Although the processes of the steps 902 to 908 are for the FR-RL system, since the same processes are performed for the FL-RR system, the description thereof is omitted. Further, although in this embodiment the P-valve turning-point amount Icp is obtained on the basis of the difference between the front and rear wheel lock parameters Lpf and Lpr, it is also appropriate to obtain it on the basis of the ratio of the front and rear wheel lock parameters Lpf and Lpr. In addition, although in this embodiment the drive signal for the piezo-pump is a sine-wave signal, it is also appropriate to use a triangular-wave signal as the drive signal.

It should be understood that the foregoing relates to only a preferred embodiment of the invention, and that it is intended to cover all changes and modifications of the embodiment of the invention herein used for the purposes of the disclosure, which do not constitute departures from the spirit and scope of the invention.

What is claimed is:

1. A brake apparatus for use in a motor vehicle having at least one font-side wheel and at least one rear-side wheel, comprising:
    a braking pressure supply system including a master cylinder of said vehicle for generating a braking pressure in response to operation of a braking pedal of said vehicle, front-side and rear-side wheel braking cylinders for applying braking forces to said front-side wheel and rear-side wheel, and first and second supply passage for conducting braking pressure generated by said master cylinder to said front-side and rear-side wheel braking cylinders, respectively.
    braking pressure adjusting means, provided in said braking pressure supply system, for adjusting the braking pressure to be applied to said front-side and rear-side wheel braking cylinders in accordance with a drive signal;
    first sensor means for sensing a speed of said front-side wheel and generating a first detection signal indicative of the sensed speed of said front-side wheel;
    second sensor means for sensing a speed of said rear-side wheel and generating a second detection signal indicative of the sensed speed of said front-side wheel;
    proportioning valve means, provided in said second supply passage of said braking pressure supply system, for controlling the braking pressure to be applied to said rear-side wheel braking cylinder in accordance with a control signal so as to vary the ratio of the braking pressure to said rear-side wheel braking cylinder with respect to the braking pressure to be applied to said front-side wheel braking cylinder; and
    electronic control means, responsive to said first and second detection signals for producing said control signal and said drive signal, said electronic control means including;

first lock-tendency calculation means for calculating a lock tendency of said front-side wheel on the basis of said first detection signal;
second lock-tendency calculation means for calculating a lock tendency of said rear-side wheel on the basis of said second detection signal;
parameter calculation means coupled to said first and second lock-tendency calculation means for determining a difference between said front-side wheel and rear-side wheel lock tendencies calculated in said first and second lock-tendency calculation means and generating a parameter indicative thereof;
command-value calculation means for calculating a command value by integrating the parameter;
first output means for outputting to said braking pressure adjusting means said drive signal determined in accordance with the lock tendencies calculated by said first and second lock-tendency calculation means; and
second output means for outputting to said proportioning valve means said control signal determined in accordance with the command value.

2. A brake apparatus as claimed in claim 1, wherein said braking pressure adjusting means includes:
control valve means for increasing and decreasing the braking pressures applied to said front-side and rear-side wheel braking cylinders; and
pump means for discharging the braking pressure emerging from said front-side and rear-side wheel braking cylinders during pressure-decreasing by said control valve means, said pump means comprising piezoelectric means which expands and contracts in response to application of non-rectangular-wave voltage thereto.

3. A brake apparatus as claimed in claim 1, wherein said braking pressure adjusting means includes control valve means for increasing and decreasing the braking pressures applied to said front-side and rear-side wheel braking cylinders, pump means for discharging the braking pressure emerging from said front-side and rear-side wheel braking cylinders during pressure-decreasing by said control valve means, and reservoir means for storing the braking pressure, said control valve means being provided adjacent to said proportioning valve means such that both control and proportioning valve means are provided between said rear-side wheel braking cylinder and said reservoir means for controlling the relative pressures therebetween during pressure-decreasing of said rear-side wheel braking cylinder, and said control valve means being further provided between said front-side wheel braking cylinder and said reservoir means for controlling the relative pressures therebetween during pressure-decreasing of said front-side wheel braking cylinder.

4. A brake apparatus as claimed in claim 1, wherein said braking pressure adjusting means includes control valve means for increasing and decreasing the braking pressures applied to said front-side and rear-side wheel braking cylinders, pump means for discharging the braking pressure emerging from said front-side and rear-side wheel braking cylinders during pressure-decreasing by said control valve means, and shut off valve means for shutting off the communication between said brake apparatus and said front-side and rear-side wheel braking cylinders when said brake apparatus is under the condition of a predetermined control operation.

5. A brake apparatus as claimed in claim 1, wherein said electronic control means further includes vehicle-speed estimating means for estimating a speed of said motor vehicle on the basis of said first and second detection signals from said first and second sensor means, and said first lock-tendency calculation means comprising means for calculating a wheel speed $V_F$ and deceleration $G_F$ of said front-side wheel on the basis of said first detection signal, means for determining a front-wheel target speed $V_{STF}$ and front-wheel target deceleration $G_{STF}$ on the basis of the estimated vehicle speed, means for obtaining a lock parameter $L_{PF}$ in accordance with an equation $L_{PF} = K1(V_F - V_{STF}) + K2(G_F - G_{STF})$ where K1 and K2 are constants and means for calculating the lock tendency on the basis of the obtained lock parameter $L_{PF}$, and further said second lock-tendency calculation means comprising means for calculating a wheel speed $V_R$ and deceleration $G_R$ of said rear-side wheel on the basis of said second detection signal, means for determining a rear-wheel target speed $V_{STR}$ and rear-wheel target deceleration $G_{STR}$ on the basis of the estimated vehicle speed, means for obtain a lock parameter $L_{PR}$ in accordance with an equation $L_{PR} = K1(V_R - V_{STR}) + K2(G - G_{STF})$ and means for calculating the lock tendency on the basis of the obtained lock parameter $L_{PR}$.

6. A brake apparatus as claimed in claim 1, wherein said proportioning valve means has a proportional characteristic which is variable for changing the ratio of the braking pressure of said rear-side wheel braking cylinder to the braking pressure of said front-side wheel braking cylinder in accordance with said control signal, and said command-value calculation means calculates said command value so as to vary said proportional characteristic during pressure-decreasing.

7. A brake apparatus as claimed in claim 1, wherein said command-value calculation means compares said parameter calculation means with a predetermined threshold so that the initial value of said command value is set to a predetermined maximum value when said parameter is greater than said predetermined threshold and said command value is set to zero when said parameter is less than said predetermined threshold.

8. A brake apparatus as claimed in claim 1, wherein said command-value calculation means calculates said command value Icp(n) in accordance with the following equation:

$$Icp(n) = Icp(n-1) + K3 \cdot Cp$$

where Icp(n−1) represents a previously calculated command value, K3 designates a constant, and Cp is the parameter calculated by said parameter calculation means.

* * * * *